US008739172B2

(12) United States Patent
Prakash S M et al.

(10) Patent No.: US 8,739,172 B2
(45) Date of Patent: May 27, 2014

(54) GENERATING A VIRTUAL MACHINE PLACEMENT PLAN FOR AN IDENTIFIED SEASONALITY OF SEGMENTS OF AN AGGREGATED RESOURCE USAGE

(75) Inventors: Shiva Prakash S M, Karnataka (IN); Balasubramanya Ramananda, Karnataka (IN); Venkatesh R. Ramteke, Karnataka (IN); Jerome Rolia, Kanata (CA); Mustazirul Islam, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 13/350,984

(22) Filed: Jan. 16, 2012

(65) Prior Publication Data

US 2013/0185718 A1 Jul. 18, 2013

(51) Int. Cl.
*G06F 9/46* (2006.01)
*G06F 9/455* (2006.01)
*G06F 9/50* (2006.01)
*G06F 9/52* (2006.01)
*G06F 9/445* (2006.01)
*G06Q 10/06* (2012.01)
*G06F 11/34* (2006.01)

(52) U.S. Cl.
CPC *G06F 9/505* (2013.01); *G06F 9/52* (2013.01); *G06F 9/455* (2013.01); *G06F 8/61* (2013.01); *G06Q 10/0631* (2013.01); *G06F 11/3433* (2013.01)
USPC ............... 718/104; 718/105; 718/1; 717/176; 705/7.12

(58) Field of Classification Search
None
See application file for complete search history.

(56) References Cited

U.S. PATENT DOCUMENTS

| 8,423,998 B2* | 4/2013 | Isci et al. ........................ 717/176 |
| 2008/0295096 A1* | 11/2008 | Beaty et al. ....................... 705/7 |
| 2009/0293022 A1 | 11/2009 | Fries | |
| 2010/0269109 A1 | 10/2010 | Cartales | |

OTHER PUBLICATIONS

Kochut et al.; On Strategies for Dynamic Resource Management in Virtualized Server Environments, MASCOTS '07; Oct. 24-26, 2007.*
Tan et al.; Exploiting Resource Usage Patterns for Better Utilization Prediction, IEEE 2011.*
Setzer et al.; Filtering Multivariate Workload Non-Conformance in Shared IT-Infrastructures; 12th IFIP/IEEE IM 2011.*
Meng, et al., "Efficient Resource Provisioning in Compute Clouds via VM Multiplexing," ICAC'10, Jun. 7-11, 2010, Washington, DC, USA, pp. 11-20.
Ruest, et al., "How to Optimize VM Placement in Data Centers," Apr. 2010, Retrieved from searchdatacenter.techtarget.com/tip/How-to-optimize-VM-placement-in-data-centers, 14 pages.

(Continued)

*Primary Examiner* — Meng An
*Assistant Examiner* — Bing Zhao

(57) ABSTRACT

Methods, systems, and computer-readable media with executable instructions stored thereon for a virtual machine (VM) placement plan are provided. Seasonality of a measured aggregated resource usage of a group of VMs can be identified. A VM placement plan for the identified seasonality can be generated by a computing device.

14 Claims, 3 Drawing Sheets

(56) References Cited

OTHER PUBLICATIONS

Setzer, et al., "Decision Support for Virtual Machine Reassignments in Enterprise Data Centers," Apr. 19-23, 2010, Retrieved from dss.in.turn.de/files/bichler-research/2010_setzer_svdreassignment.pdf, 7 pages.

Jayasinghe, et al, "Improving Performance and Availability of Services Hosted on IaaS Clouds with Structural Constraint-aware Virtual Machine Placement," Jul. 4-9, 2011, Retrieved from www.cc.gatech.edu/grads/i/ijayasin/resources/ieee-scc-2011.pdf, 8 pages.

Almeida, et al., "Joint Admission Control and Resource Allocation in Virtualized Servers," Journal of Parallel and Distributed Computing, vol. 70, Issue 4, Apr. 2010, pp. 344-362.

Forys, et al "Automated Workload Placement Recommnedations for a Data Center," U.S. Appl. No. 12/259,837, filed Oct. 28, 2008, 42 pages.

Ozonat, Kivanc., "An Information-Theoretic Approach to Detecting Performance Anomalies and Changes for Large-scale Distributed Web Services", International Conference on Dependable Systems and Networks, Jun. 24-27, 2008, pp. 522-531, Anchorage, Alaska.

* cited by examiner

GENERATING A VIRTUAL MACHINE PLACEMENT PLAN FOR AN IDENTIFIED SEASONALITY OF SEGMENTS OF AN AGGREGATED RESOURCE USAGE

BACKGROUND

Resource demand in a datacenter may not be uniform through a given time period such as a day or a week. As such, computing resources sufficient to satisfy the resource demand vary. Typically, computing resources of a datacenter are allotted to handle a maximum resource demand.

DETAILED DESCRIPTION

Figure 1:
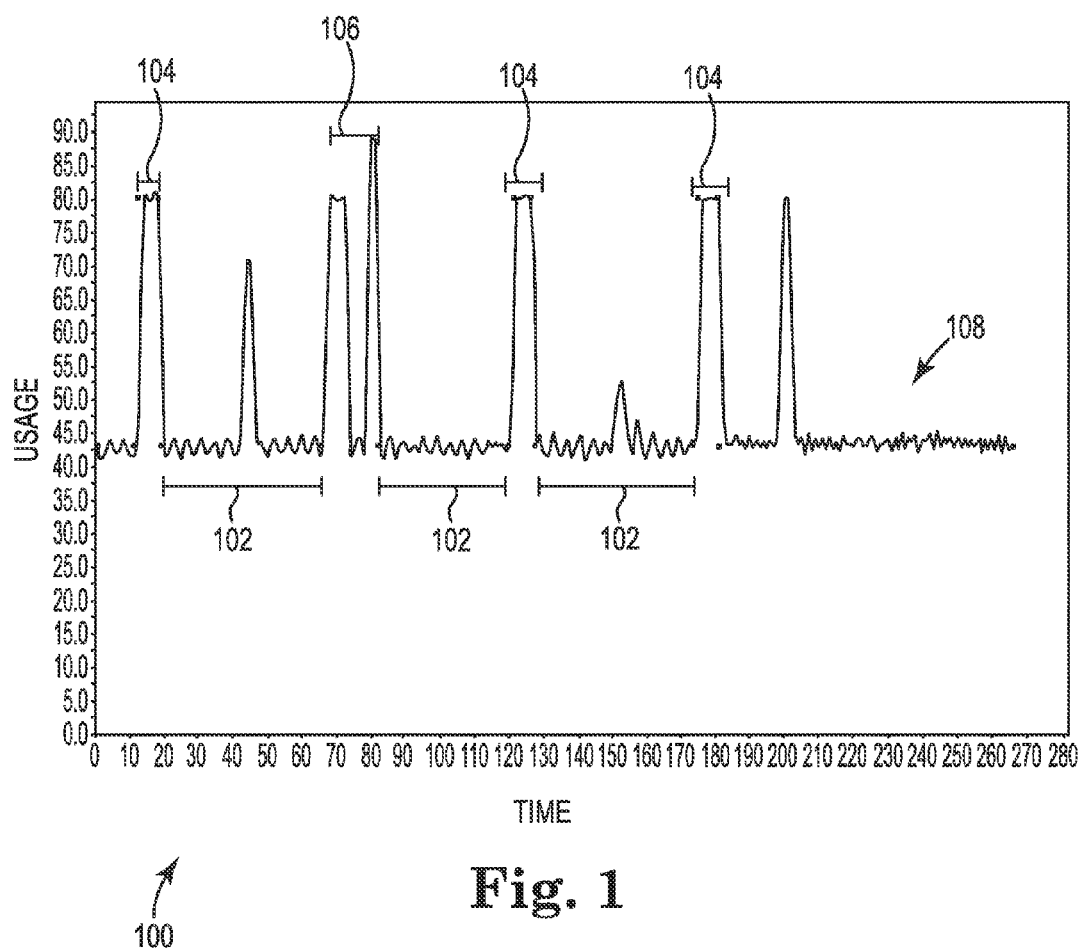
FIG. 1 is an example aggregated resource usage chart according to the present disclosure.

Examples of the present disclosure include methods, systems, and computer-readable media with executable instructions stored thereon for a virtual machine (VM) placement plan. Seasonality of a measured aggregated resource usage of a group of VMs can be identified. A VM placement plan for the identified seasonality can be generated by a computing device.

Resource usage can be made more efficient by placing virtual machines (VMs) with complimentary resource demand on a VM host. However, such an approach does not take into consideration seasonality (e.g., changes in resource demand) of an overall demand (e.g., aggregated resource demand). Resource demand within a datacenter can vary for a number of reasons. For example, seasonality of a stock brokerage datacenter may vary such that resource demands are increased during business hours as compared to the weekends, or seasonality of a datacenter associated with an educational institution may alter such that resource demands are decreased during the months of summer vacation as opposed to when the institution is in session. However, seasonality may not be readily identifiable and/or incorporated into a VM placement plan.

Examples of the present disclosure can include a factoring seasonality into a VM placement plan. The seasonality can include identification of a number of VMs that can be migrated to a host or cluster according to the VM placement plan. Such examples can include VM placement plans customized according to each identified season which may, for example, improve resource usage efficiency as compared to previous approaches and/or increase cost savings as compared to previous approaches.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is an example aggregated resource usage chart 100 according to the present disclosure. Chart 100 has time plotted on the x-axis and aggregated resource usage on the y-axis. Chart 100 includes a measured aggregated resource usage plot 108. A measured aggregated resource usage can include compiled resource usage measured from resources (e.g., devices) of a datacenter. In an example, the devices may be grouped according to a common characteristic, such as a type of business service, type of business unit, clusters, datacenter, complimentary resource usage, etc. Resources can include central processing units, VMs, memory, combination thereof, etc.

Measured aggregated resource usage plot 108 includes 3 distinct segments: 102, 104, and 106. Segments may be user defined and/or defined by a computing device. A segment includes a portion of the aggregated resource usage chart 100 which is distinguishable from an adjacent portion of the aggregated resource usage chart 100. A segment may, for example, be repeated within the aggregated resource usage chart. For example, in chart 100, segment 102 and 104 are repeated.

A segment may include multiple measurements of the resource usage chart that have a statistical measure exceeding a similarity threshold. A statistical measure may include, but is not limited to, a percentage a measured value is within an identified value, an $R^2$ value, a sigma value, etc. A similarity threshold can include a number that indicates a lower limit value that the statistical measure can be to indicate a similarity in the multiple measurements. For example, segment 102 may be defined by concurrent measurements of aggregated resource usage that are within a threshold similarity percentage of one another (e.g., each concurrent measurement is within 95% of the concurrent measurement before and/or after).

Segments may include multiple measurements over a length of time. For example, Segment 104 may be defined as the time at which a first measured aggregated resource usage occurs above 70 until the time a second measured aggregated resource usage occurs below 70.

Figure 2:
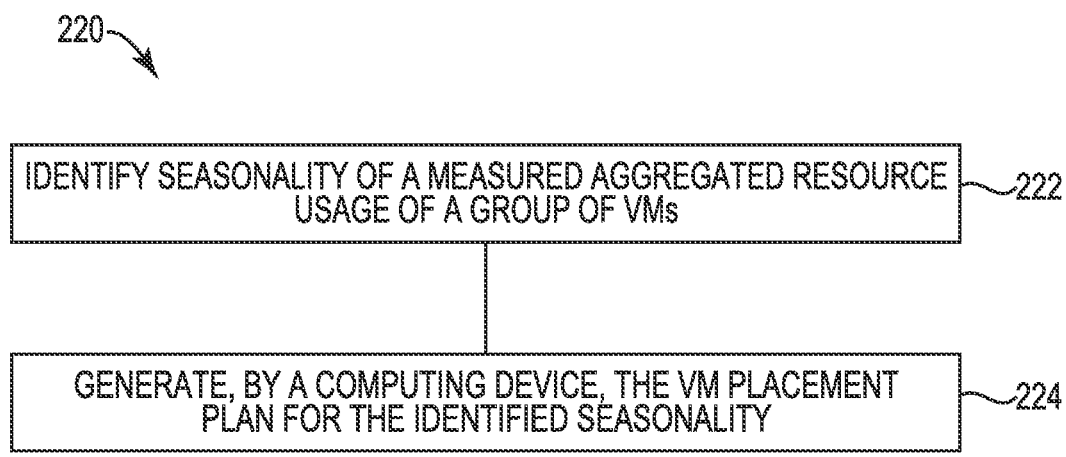
FIG. 2 is a flow chart illustrating an example of a method for a virtual machine placement plan according to the present disclosure.

FIG. 2 is a flow chart illustrating an example of a method 220 for a virtual machine placement plan. Seasonality of a measured aggregated resource usage of a group of VMs is identified at 222. The group of VMs may be grouped automatically and/or manually. Seasonality includes a segment of time and/or resource usage which is distinguishable from another segment of time and/or resource usage. For example, aggregated resource usage within a datacenter may require 100 VM hosts Monday through Friday during business hours of 8:00 AM to 5:00 PM but only 30 VM hosts Monday through Friday during non-business hours and during the weekends. Such a datacenter can be said to have two seasonalities: a business hour seasonality and a non-business hour seasonality. The business hour seasonality may be identifiable by a spike in resource demand (e.g., FIG. 1, 104), whereas the non-business hour seasonality may be identifiable by a lull in resource demand (e.g., FIG. 1, 102).

Seasonality may be identified using a segmentation function. For example, a segmentation function may partition a timeline of historical measured aggregated resource usage data (e.g., FIG. 1, 108) into the group of VMs such that segments (e.g., FIG. 1, 102, 104, 106) of an aggregated resource usage chart (e.g., FIG. 1, 100) can be identified.

A segmentation function may, for example, model each segment as a Gaussian distribution and compute the statistical distance between the distributions of the segments and Gaussian models of the segments. Statistical distance includes a measure of the difference between probability distributions (e.g., Gaussian distributions). Segment locations can be identified as those locations that reduce the total statistical distance to a desired limit.

Seasonality can be identified, for example, by distinguishing a segment of the measured aggregated resource usage from an adjacent segment of the measured aggregated resource usage via a difference threshold. For example, segment 102 of FIG. 1 can be distinguished from segment 104 via a percentage difference between a number of concurrent aggregated resource usage measurements.

Seasonality can be identified, for example, by discerning segments within a threshold range from one another that have a measured aggregated resource usage exceeding a similarity threshold. A threshold range may include segments equidistant from one another in time, segments within a percentage of equidistant from one another, and/or combinations thereof. For example, each segment 102 of FIG. 1 can be said to be within a threshold range from one another (e.g., within a threshold range of 20 times units apart). Further, each segment 102 may be said to have a measured aggregated resource usage exceeding a similarity threshold. For example, each segment may be within a percentage of the average value of each segment's measured aggregated resource usage values (e.g., 43).

Seasonality of the measured aggregated resource usage may include more than one season. For example, seasonality may include two seasons applicable during business hours. Seasonality may include more than one season for the same datacenter and/or group of VMs.

The method 220 includes generating, by a computing device, the VM placement plan for the identified seasonality at 224. A VM placement plan may include a plan for placing VMs with complimentary resource usage demands. VMs with complimentary resource usage demands can include the group of VMs of the identified seasonality. For example, a VM placement plan may include a plan to place the group of VMs of segment 102 of FIG. 1, the VMs of segment 104, and/or the VMs of segment 106. That is, VMs with complimentary resource usage demands can include a group of VMs of a segment of the identified seasonality.

The VM placement plan can include placing the group of VMs of the segments within a threshold range of one another on a single host. The VMs of the segments within the threshold range of one another can include VMs with complimentary resource usage demands. For example, the group of VMs within segment 102 of FIG. 1 may be placed, within the VM placement plan, on a single VM host. In an example, more than one group of VMs may be placed on a single host.

A VM placement plan may be generated for each season of the identified seasonality. For example, a season identified as the business hour season may have a VM placement plan, and a season identified as the non-business hour season may have a VM placement plan. An identified seasonality that has multiple seasons during an overlapping time frame (e.g., business hours) may generate a VM placement plan for each season.

Examples include generating a VM placement plan that incorporates a constraint. A constraint can include a number of technical and/or business constraints. A constraint can, for example, be user defined, defined by a computing system, and/or combinations thereof. Types of constraints include, but are not limited to, VM usage restrictions, security considerations, customer preferences, critical resource considerations, usage spike considerations, etc.

Examples of the present disclosure include developing a migration plan for the VM placement plan. A migration plan can include a plan that factors the generated VM placement plan and migration considerations in moving VMs from a current location to a host suggested by the VM placement plan. Factors of a migration plan may, for example, include, cost of migration factor (e.g., the cost associated with migrating a datacenter to the generated VM placement play, start-up considerations, shut-down considerations, maintenance considerations, host conversion considerations, and combinations thereof, etc. Each season of the identified seasonality may, for example, have a generated VM placement plan and developed migration plan. A migration plan can, for example, be developed according to an operator preference. For example, a migration plan can be developed, per an operator preference, such that the number of migrations (e.g., moving VMs to a suggested host) are limited.

Figure 3:
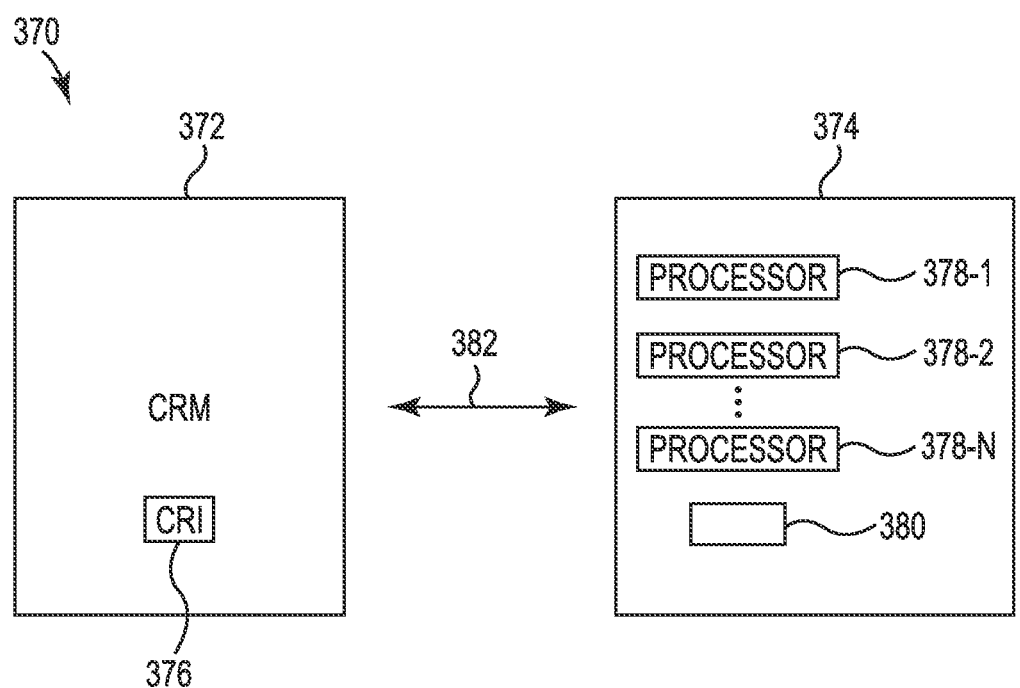
FIG. 3 illustrates a block diagram of an example of a computer-readable medium in communication with processing resources for a virtual machine placement plan according to the present disclosure.

FIG. 3 illustrates a block diagram 370 of an example of a computer-readable medium in communication with processing resources for a VM placement plan according to the present disclosure. Computer-readable medium (CRM) 372 can be in communication with a computing device 374 having processor resources of more or fewer than 378-1, 378-2, ..., 378-N, that can be in communication with, and/or receive a tangible non-transitory CRM 372 storing a set of computer-readable instructions 376 executable by one or more of the processor resources (e.g., 378-1, 378-2, ..., 378-N) for a VM placement plan as described herein. The computing device 374 may include memory resources 380, and the processor resources 378-1, 378-2, ..., 378-N may be coupled to the memory resources 380.

Processor resources can execute computer-readable instructions 376 for a VM placement plan and are stored on an internal or external non-transitory CRM 372. A non-transitory CRM (e.g., 372), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory CRM 372 can be integral, or communicatively coupled, to a computing device, in either in a wired or wireless manner. For example, the non-transitory CRM can be an internal memory, a portable memory, a portable disk, or a memory located internal to another computing resource (e.g., enabling the computer-readable instructions 376 to be downloaded over the Internet).

The CRM 372 can be in communication with the processor resources (e.g., 378-1, 378-2, ..., 378-N) via a communication path 382. The communication path 382 can be local or remote to a machine associated with the processor resources 378-1, 378-2, ..., 378-N. Examples of a local communication path 382 can include an electronic bus internal to a machine such as a computer where the CRM 372 is one of volatile, non-volatile, fixed, and/or removable storage medium in communication with the processor resources (e.g., 378-1, 378-2, . . . , 378-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 382 can be such that the CRM 372 is remote from the processor resources (e.g., 378-1, 378-2, . . . , 378-N) such as in the example of a network connection between the CRM 372 and the processor resources (e.g., 378-1, 378-2, . . . , 378-N). That is, the communication path 382 can be a network connection. Examples of such a network connection can include a local area network (LAN), a wide area network (WAN), a personal area network (PAN), and the Internet, among others. In such examples, the CRM 372 may be associated with a first computing device and the processor resources (e.g., 378-1, 378-2, . . . , 378-N) may be associated with a second computing device.

Processor resources 378-1, 378-2, . . . , 378-N coupled to the memory 380 can apply a segmentation function to a measured aggregated resource usage of a datacenter. Further, processor resources 378-1, 378-2, . . . , 378-N can identify, from the segmentation function, a seasonality of the measured aggregated resource usage of a group of VMs of the datacenter, and a VM placement plan for the identified seasonality can be generated. Processor resources 378-1, 378-2, . . . , 378-N can, for example, develop a migration plan for the VM placement plan.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method for a virtual machine (VM) placement plan, comprising:

identifying seasonality of a measured aggregated resource usage of a group of VMs by discerning segments of the measured aggregated resource usage that are within a particular range of one another and that have a measured aggregated resource usage exceeding a similarity threshold and distinguishing a segment of the measured aggregated resource usage from an adjacent segment of the measured aggregated resource usage based on a difference threshold; and generating, by a computing device, the VM placement plan for the identified seasonality, wherein the placement plan includes VMs of each discerned segment within the particular range placed on a single respective host.

2. The method of claim 1, wherein identifying the seasonality includes using a segmentation function to:

determine a historical distribution of each segment;

model each segment as a distribution; and determine a statistical distance between historical distributions of the segments and the modeled distributions of the segments.

3. The method of claim 1, wherein the threshold range includes at least one of:

segments equidistant from one another in time; and segments within a percentage of equidistant from one another.

4. The method of claim 1, wherein generating the VM placement plan includes incorporating a constraint.

5. A non-transitory computer-readable medium storing a set of instructions executable by a computer to cause the computer to:

apply a segmentation function to a measured aggregated resource usage of a datacenter;

identify, from the segmentation function, a seasonality of the measured aggregated resource usage by discerning segments of the measured aggregated resource usage within a particular range of one another that have a measured aggregated resource usage exceeding a similarity threshold, wherein the threshold range includes at least one of segments equidistant from one another in time and segments within a percentage of equidistant from one another; and generate a virtual machine (VM) placement plan for the identified seasonality, wherein the placement plan includes VMs of each discerned segment within the particular range placed on a single respective host.

6. The non-transitory computer-readable medium of claim 5, wherein the set of instructions executable by the computer cause the computer to distinguish a segment of the measured aggregated resource usage from an adjacent segment of the measured aggregated resource usage based on a difference threshold.

7. The non-transitory computer-readable medium of claim 5, wherein the set of instructions executable by the computer cause the computer to use a segment of the identified seasonality to determine a group of VMs.

8. The non-transitory computer-readable medium of claim 5, wherein the set of instructions executable by the computer cause the computer to distinguish more than one season of the identified seasonality of the measured aggregated resource.

9. The non-transitory computer-readable medium of claim 8, wherein the set of instructions executable by the computer cause the computer to generate a VM placement plan for each season.

10. The non-transitory computer-readable medium of claim 9, wherein the set of instructions executable by the computer cause the computer to analyze a constraint and incorporate the constraint into the VM placement plan for each season.

11. A computing system for a virtual machine (VM) placement plan, comprising:
   a memory; and
   a processor resource coupled to the memory, to:
   apply a segmentation function to a measured aggregated resource usage of a datacenter;
   identify, from the segmentation function, a seasonality of the measured aggregated resource usage of a group of VMs of the datacenter by:
   discerning segments of the measured aggregated resource usage within a particular range from one another that have a measured aggregated resource usage exceeding a similarity threshold;
   determining a historical distribution of each segment;
   modeling each segment as a distribution; and
   determining a statistical distance between historical distributions of the segments and the modeled distributions of the segments;
   generate the VM placement plan for the identified seasonality, wherein the placement plan includes VMs of each discerned segment within the particular range placed on a single respective host; and
   develop a migration plan for the VM placement plan.

12. The system of claim 11, wherein the processor resource is coupled to the memory to incorporate a cost of migration factor for the VM placement plan.

13. The system of claim 11, wherein the identified seasonality includes more than one season and each of the more than one season includes a VM placement plan and a migration plan.

14. The system of claim 11, wherein the group of VMs includes VMs of a related business unit.

* * * * *